United States Patent
Hironaka (10) Patent No.: US 11,994,433 B2
(45) Date of Patent: May 28, 2024

(54) TEMPERATURE SENSOR

(71) Applicant: DENSO CORPORATION, Kariya (JP)

(72) Inventor: Masaki Hironaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 529 days.

(21) Appl. No.: 17/236,304

(22) Filed: Apr. 21, 2021

(65) Prior Publication Data
US 2021/0239542 A1     Aug. 5, 2021

Related U.S. Application Data

(63) Continuation of application No. PCT/JP2019/040349, filed on Oct. 14, 2019.

(30) Foreign Application Priority Data

Oct. 22, 2018    (JP) .................................. 2018-198079

(51) Int. Cl.
     *G01K 7/22*          (2006.01)
     *G01K 7/02*          (2021.01)
     (Continued)

(52) U.S. Cl.
CPC ............... *G01K 7/22* (2013.01); *G01K 7/021* (2013.01); *G01K 2007/163* (2013.01); *G01K 13/024* (2021.01); *Y02T 10/40* (2013.01)

(58) Field of Classification Search
CPC ........ G01K 7/22; G01K 7/021; G01K 13/024; G01K 2007/163; Y02T 10/40
See application file for complete search history.

(56) References Cited

U.S. PATENT DOCUMENTS

| | | | | |
|---|---|---|---|---|
| 5,302,934 A | * | 4/1994 | Hart ......................... | G01K 7/22 374/E7.018 |
| 5,949,324 A | * | 9/1999 | Segler ..................... | G01K 7/22 374/E7.028 |

(Continued)

FOREIGN PATENT DOCUMENTS

| | | |
|---|---|---|
| JP | 2006-185895 | 7/2006 |
| JP | 2011-127938 | 6/2011 |

(Continued)

*Primary Examiner* — Nathaniel T Woodward
*Assistant Examiner* — Philip L Cotey
(74) *Attorney, Agent, or Firm* — Nixon & Vanderhye P.C.

(57) ABSTRACT

The temperature sensor includes a temperature sensing element, a pair of element electrode wires, and a pair of terminals. An overlapping wire portion of each of the element electrode wires is connected to the terminal in such a manner as to overlap the terminal in an overlapping direction. A fillet portion is disposed on a side surface of the overlapping wire portion. The fillet portion has a pair of fillet pieces formed in such a manner as to crawl up from a specific main surface that is a main surface at the overlapping wire portion side in the terminal. In a cross section of the temperature sensor orthogonal to a sensor axis direction and passing through the fillet portion, the maximum length in a width direction of the fillet portion is defined as a fillet maximum width A, and a length in a width direction between a pair of boundary portions between the pair of fillet pieces and the specific main surface is defined as a boundary width B. The temperature sensor has, at least partly in the sensor axis direction, a specific cross section satisfying B≤A, as a cross section of the temperature sensor orthogonal to the sensor axis direction and passing through the fillet portion.

10 Claims, 6 Drawing Sheets

(51) Int. Cl.
*G01K 7/16* (2006.01)
*G01K 13/024* (2021.01)

(56) References Cited

U.S. PATENT DOCUMENTS

| | | | | |
|---|---|---|---|---|
| 6,130,598 | A * | 10/2000 | Katsuki | G01K 1/16 |
| | | | | 374/185 |
| 6,264,363 | B1 * | 7/2001 | Takahashi | G01K 7/22 |
| | | | | 374/185 |
| 6,297,723 | B1 * | 10/2001 | Shoji | G01K 7/22 |
| | | | | 374/185 |
| 7,201,513 | B2 * | 4/2007 | Nakabayashi | G01K 13/02 |
| | | | | 73/866.5 |
| 8,269,598 | B2 * | 9/2012 | Kobayashi | G01K 7/22 |
| | | | | 374/208 |
| 8,398,302 | B2 * | 3/2013 | Hori | G01K 1/20 |
| | | | | 73/114.75 |
| 8,591,104 | B2 * | 11/2013 | Suzuki | G01K 1/08 |
| | | | | 374/185 |
| 2010/0195698 | A1 * | 8/2010 | Hori | G01K 1/14 |
| | | | | 374/E13.006 |
| 2010/0214054 | A1 * | 8/2010 | Kobayashi | H01C 1/148 |
| | | | | 338/22 R |
| 2011/0228812 | A1 * | 9/2011 | Suzuki | G01K 1/08 |
| | | | | 374/163 |
| 2013/0017628 | A1 * | 1/2013 | Kosugi | H01L 21/67248 |
| | | | | 374/E7.004 |
| 2017/0016777 | A1 * | 1/2017 | Yoshihara | G01K 1/08 |
| 2018/0159280 | A1 * | 6/2018 | Watanabe | G01K 1/14 |

FOREIGN PATENT DOCUMENTS

| | | |
|---|---|---|
| JP | 2013-015397 | 1/2013 |
| JP | 2017-045742 | 3/2017 |
| JP | 2017-076498 | 4/2017 |

* cited by examiner

TEMPERATURE SENSOR

CROSS-REFERENCE TO RELATED APPLICATION

This application is the U.S. bypass application of International Application No. PCT/JP2019/040349 filed on Oct. 14, 2019 which designated the U.S. and claims priority to Japanese Patent Application No. 2018-198079, filed on Oct. 22, 2018, the contents of both of which are incorporated herein by reference.

TECHNICAL FIELD

The present disclosure relates to a temperature sensor.

BACKGROUND

JP 2011-127938 A discloses a temperature sensor for measuring a temperature of exhaust gas from an engine. The temperature sensor disclosed in JP 2011-127938 A is a temperature sensor including a temperature sensor element such as a thermistor for detecting a temperature of exhaust gas, a pair of electrode wires extending from the temperature sensor element, and terminal fittings to connect between a pair of the electrode wires and a pair of lead wires for external output.

SUMMARY

An aspect of the present disclosure is a temperature sensor including:
- a temperature sensing element for detecting a temperature;
- a pair of element electrode wires connected to the temperature sensing element; and
- a pair of terminals connected to respective ones of a pair of the element electrode wires, in which
  the element electrode wires each have an overlapping wire portion connected to the terminal in such a manner as to overlap the terminal in an overlapping direction orthogonal to a sensor axis direction,
  a fillet portion is disposed on a side surface of the overlapping wire portion, and the fillet portion has a pair of fillet pieces formed in such a manner as to crawl up from a specific main surface that is a main surface at the overlapping wire portion side in the terminal, and
  when a direction orthogonal to both the sensor axis direction and the overlapping direction is defined as a width direction, and in a cross section orthogonal to the sensor axis direction and passing through the fillet portion, a maximum length in the width direction of the fillet portion is defined as a fillet maximum width A, and a length in the width direction between a pair of boundary portions between a pair of the fillet pieces and the specific main surface is defined as a boundary width B,
  the temperature sensor has, at least partly in the sensor axis direction, a specific cross section satisfying B≤A, as a cross section orthogonal to the sensor axis direction and passing through the fillet portion.

BRIEF DESCRIPTION OF THE DRAWINGS

The above features of the present disclosure will be made clearer by the following detailed description, given referring to the appended drawings. In the accompanying drawings.

DETAILED DESCRIPTION OF THE PREFERRED EMBODIMENTS

In the temperature sensor described in JP 2011-127938 A, the electrode wire and the terminal fitting overlap in a direction orthogonal to a sensor axis direction and are connected to each other by brazing. As understood from FIG. 4 or the like of JP 2011-127938 A, a fillet portion formed during the brazing between the electrode wire and the terminal fitting is disposed on a side surface of the electrode wire.

In the temperature sensor described in JP 2011-127938 A, the fillet portion has a widening shape in which the width increases toward the terminal fitting side in the overlapping direction of the electrode wire and the terminal fitting. Therefore, a contact surface between the fillet portion and the terminal fitting is large, and heat of the temperature sensor element is likely to escape from the electrode wire to the terminal via the fillet portion.

The present disclosure is to provide a temperature sensor which can suppress heat dissipation from the element electrode wire to the terminal via the fillet portion.

An aspect of the present disclosure is a temperature sensor including:
- a temperature sensing element for detecting a temperature;
- a pair of element electrode wires connected to the temperature sensing element; and
- a pair of terminals connected to respective ones of a pair of the element electrode wires, in which
  the element electrode wires each have an overlapping wire portion connected to the terminal in such a manner as to overlap the terminal in an overlapping direction orthogonal to a sensor axis direction,
  a fillet portion is disposed on a side surface of the overlapping wire portion, and the fillet portion has a pair of fillet pieces formed in such a manner as to crawl up from a specific main surface that is a main surface at the overlapping wire portion side in the terminal, and
  when a direction orthogonal to both the sensor axis direction and the overlapping direction is defined as a width direction, and in a cross section orthogonal to the sensor axis direction and passing through the fillet portion, a maximum length in the width direction of the fillet portion is defined as a fillet maximum width A, and a length in the width direction between a pair of boundary portions between a pair of the fillet pieces and the specific main surface is defined as a boundary width B, the temperature sensor has, at least partly in the sensor axis direction, a specific cross section satisfying B≤A, as a cross section orthogonal to the sensor axis direction and passing through the fillet portion.

The temperature sensor of the above-described aspect has, at least partly in the sensor axis direction, a specific cross section satisfying B≤A, as a cross section orthogonal to the sensor axis direction and passing through the fillet portion. Therefore, an area orthogonal to the overlapping direction of the root portion of the fillet portion can be reduced. Accordingly, heat dissipation from the element electrode wire to the terminal via the fillet portion can be suppressed.

Thus, according to the above-described aspect, there can be provided a temperature sensor which can suppress heat dissipation from the element electrode wire to the terminal via the fillet portion.

First Embodiment

An embodiment of the temperature sensor will be described using FIG. 1 to FIG. 5.

Figure 1:
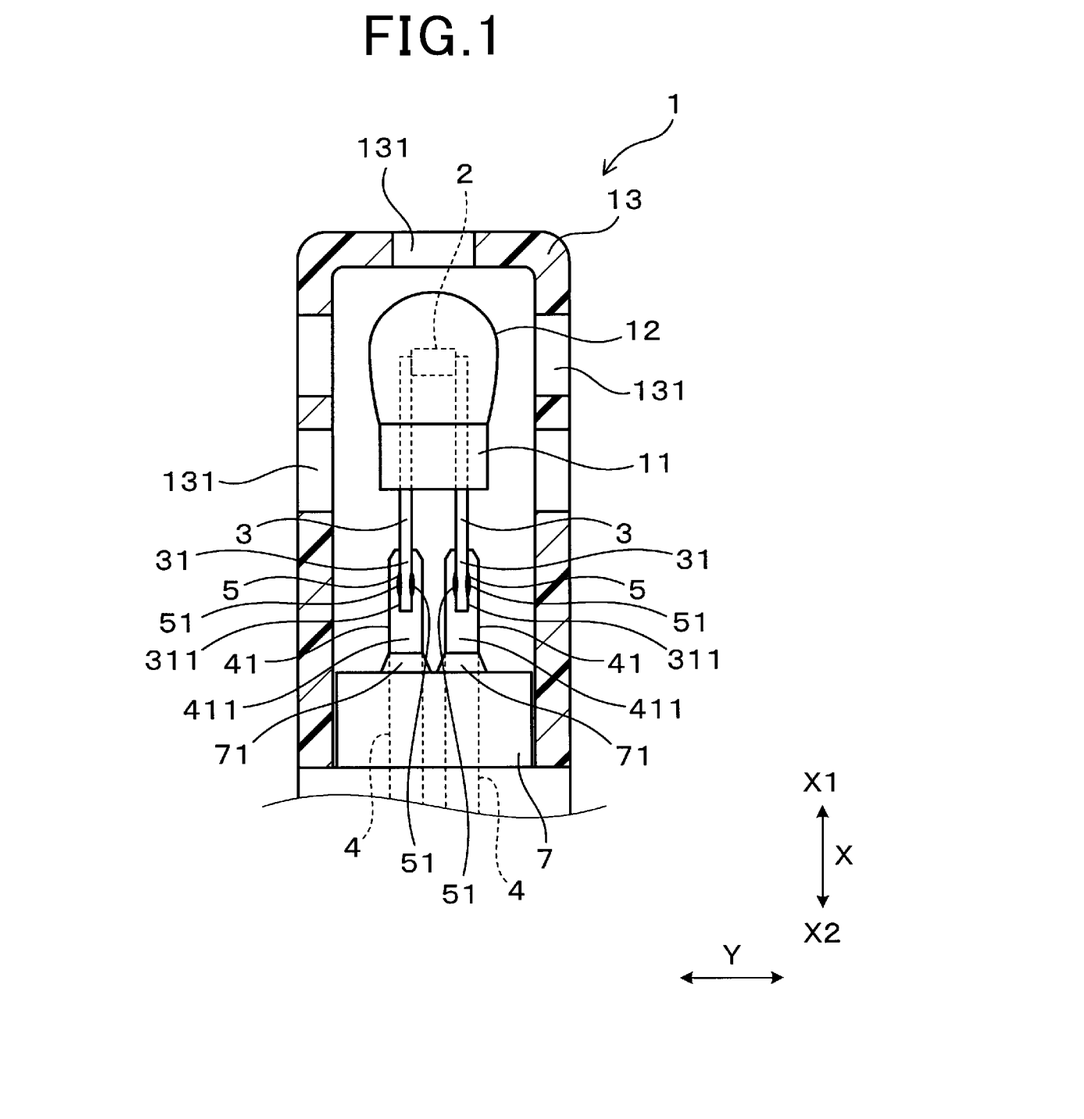
FIG. 1 is a cross-sectional front view of a part of a temperature sensor in a first embodiment.

A temperature sensor 1 of the present embodiment includes, as illustrated in FIG. 1, a temperature sensing element 2 for detecting a temperature, a pair of element electrode wires 3 connected to the temperature sensing element 2, and a pair of terminals 4 connected to respective ones of the pair of element electrode wires 3.

As illustrated in FIG. 1 to FIG. 4, the element electrode wires 3 each has an overlapping wire portion 31. The overlapping wire portion 31 is connected to the terminal 4 in such a manner as to overlap the terminal 4 in an overlapping direction Z orthogonal to a sensor axis direction X. It is noted that the sensor axis direction X is a direction in which the central axis of the temperature sensor 1 extends. In addition, a direction orthogonal to both the sensor axis direction X and the overlapping direction Z is referred to as a width direction Y.

Figure 4:
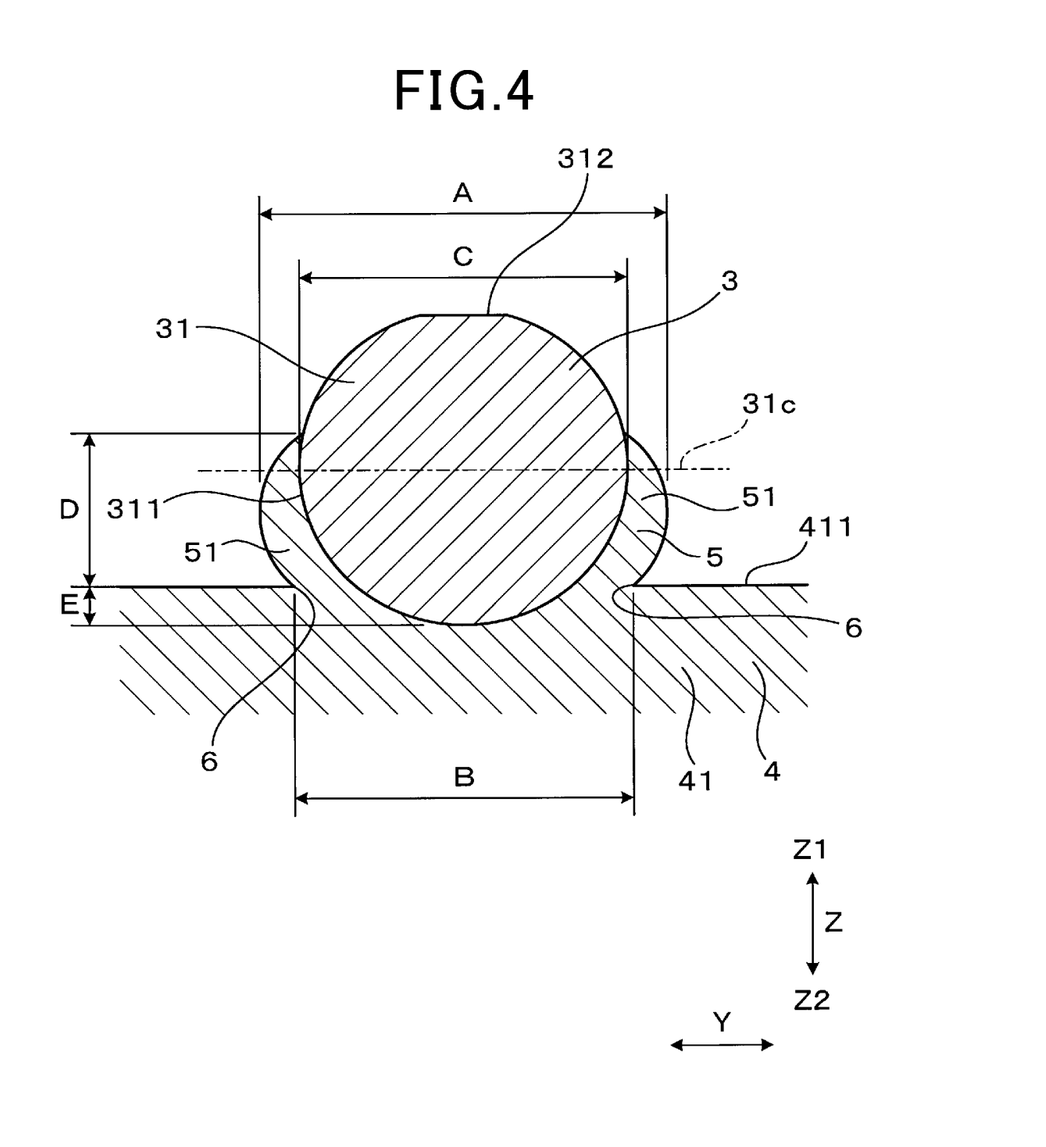
FIG. 4 is a cross-sectional view taken along lines IV-IV of FIG. 2.

As illustrated in FIG. 4, a fillet portion 5 is disposed on a side surface 311 on both sides in the width direction Y of the overlapping wire portion 31. The fillet portion 5 has a pair of fillet pieces 51 formed in such a manner as to crawl up from a specific main surface 411 that is a main surface at the overlapping wire portion 31 side in the terminal 4.

Here, in a cross section of the temperature sensor 1 orthogonal to the sensor axis direction X and passing through the fillet portion 5, the maximum length in the width direction Y of the fillet portion 5 is defined as a fillet maximum width A, and a length in the width direction Y between a pair of boundary portions 6 between the pair of fillet pieces 51 and the specific main surface 411 is defined as a boundary width B. Then, the temperature sensor 1 has, at least partly in the sensor axis direction X, a specific cross section satisfying B≤A, as a cross section of the temperature sensor 1 orthogonal to the sensor axis direction X and passing through the fillet portion 5. FIG. 4 is an example of the specific cross section.

Hereinafter, the present embodiment will be described in details.

Hereinafter, the sensor axis direction X is sometimes referred to as an X direction, the overlapping direction Z as a Z direction, and the width direction Y as a Y direction. In addition, in the X direction, a side at which the temperature sensing element 2 is disposed with respect to the terminal 4 is referred to as an X1 side, and the opposite side is referred to as an X2 side. Further, in the Z direction, a side at which the overlapping wire portion 31 of the element electrode wire 3 is disposed in the terminal 4 is referred to as a Z1 side, and the opposite side is referred to as a Z2 side.

The temperature sensor 1 of the present embodiment is attached to, for example, a hydrogen tank used in a fuel cell vehicle (so-called FCV) or the like. The temperature sensor 1 detects a temperature inside a hydrogen tank during charging of hydrogen into a hydrogen tank. The charging rate of hydrogen into a hydrogen tank is controlled based on the detection result of a temperature inside a hydrogen tank by the temperature sensor 1. Since charging of hydrogen causes shock and pressure to occur in a hydrogen tank, the temperature sensor 1 is designed to have strength capable of enduring such shock and pressure.

As illustrated in FIG. 1, the temperature sensor 1 includes a housing 7 to hold the pair of terminals 4. The housing 7 can be made of resin. For example, the housing 7 can be constituted by a resin containing 33 wt % of glass fiber in polyamide resin (PA66 resin). When the housing 7 is constituted by resin, weight and cost can be reduced. It is noted that the housing 7 can also be constituted by metal and other conductors, as long as insulation from the terminal 4 is ensured.

The housing 7 can be formed by insert molding in which the pair of terminals 4 are placed in a mold. The housing 7 holds the pair of terminals 4 while projecting terminal projecting portions 41 which are end portions at the X1 side of the pair of terminals 4. The housing 7 has a pair of surrounding portions 71 which surround root portions of the terminal projecting portions 41 in the pair of terminals 4. The surrounding portions 71 project from the X1-side end portion of the housing 7 to the X1 side and have a shape of decreasing in diameter toward the X1 side.

The pair of terminals 4 have a long-length shape in the X direction while being spaced apart from each other. The pair of terminals 4 are each electrically connected to an external apparatus at the X2 side and electrically connected to the element electrode wire 3 at the X1 side.

The terminal 4 can be constituted by stainless steel. For example, the terminal 4 can be constituted by SUS304. The melting point of the terminal 4 can be not less than 200° C. lower than the melting point of the element electrode wire 3.

The pair of terminal projecting portions 41 project from the housing 7 to the X1 side. The pair of terminal projecting portions 41 are formed in parallel to each other. The pair of terminal projecting portions 41 are spaced apart from each other in the Y direction.

Figure 2:
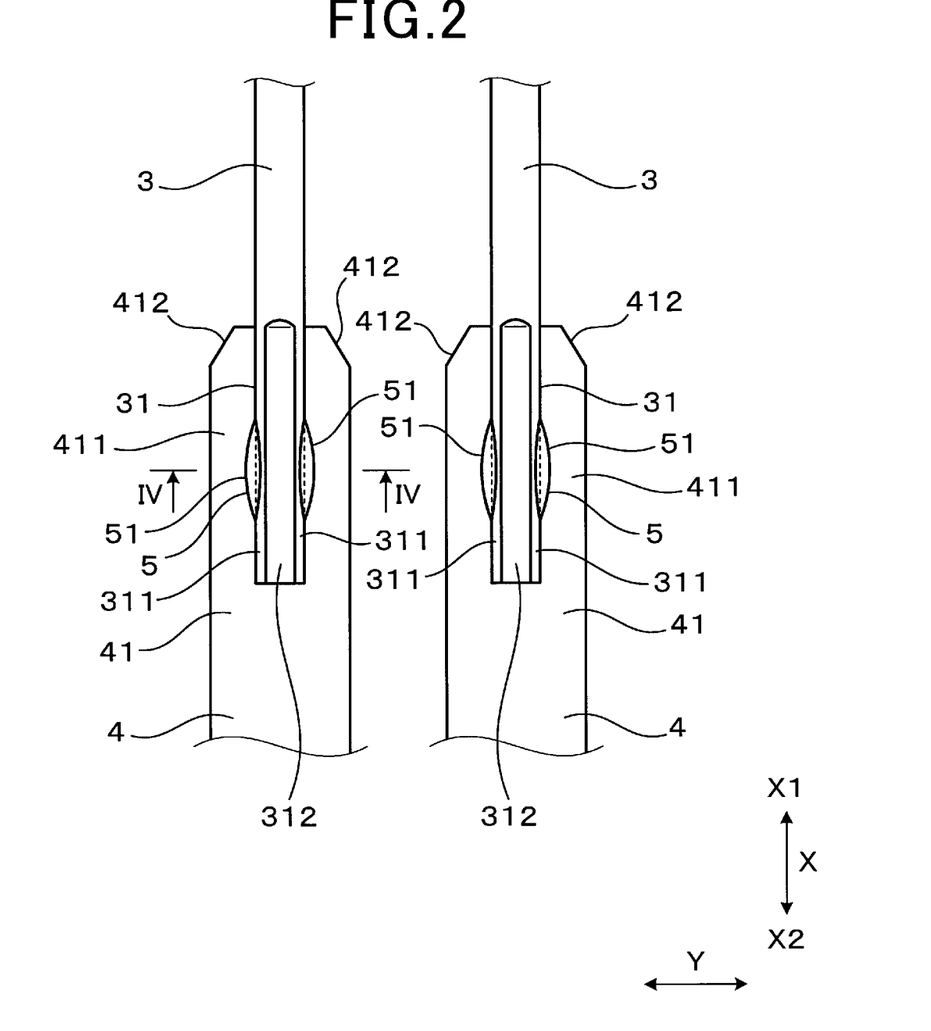
FIG. 2 is an enlarged front view around a fillet portion of a temperature sensor in the first embodiment.
Figure 3:
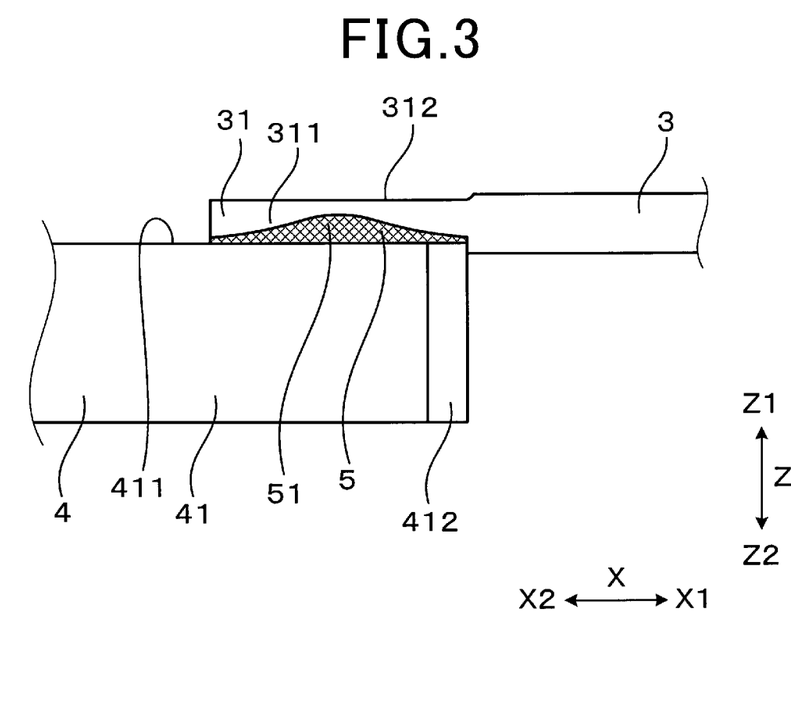
FIG. 3 is an enlarged side view around a fillet portion of a temperature sensor in the first embodiment.

As illustrated in FIG. 1 to FIG. 3, each of the terminal projecting portions 41 has thickness in the Z direction and is formed in a long-length plate-like shape in the X direction. As illustrated in FIG. 2 and FIG. 3, corner portions 412 at both sides in the Y direction of the X1-side end portion of each of the terminal projecting portions 41 are chamfered in a tapered shape toward the inside of the terminal projecting portion 41 in the Y direction as approaching the X1 side.

As illustrated FIG. 2 and FIG. 3, the overlapping wire portions 31 of the pair of element electrode wires 3 overlap and are connected with specific main surfaces 411 that are main surfaces at the Z1 side of the pair of terminal projecting portions 41. The main surface at the Z1 side of the terminal projecting portion 41 is a surface formed at the Z1 side of the terminal projecting portion 41, excluding the surface of the fillet portion 5 and adjoining the surface of the fillet portion 5.

The element electrode wire 3 is made of platinum alloy. The platinum alloy can include Pt as a base material and contain 20 wt % of Ir. As illustrated in FIG. 4, the element electrode wire 3 is formed in a round line with a circular cross section. It is noted that the element electrode wire 3 may be formed in other shapes such as linear shapes such as a cross-sectional rectangle.

As illustrated in FIG. 1, the X2-side end portion of the element electrode wire 3 is the overlapping wire portion 31 which overlaps the X1-side end portion of the terminal projecting portion 41 in the Z direction. The overlapping wire portion 31 and the terminal projecting portion 41 are connected by resistance welding.

As illustrated in FIG. 2 to FIG. 4, a flat portion 312 orthogonal to the Z direction is formed at the Z1 side of the overlapping wire portion 31. The flat portion 312 is formed when pressure is applied on the overlapping wire portion 31 by an electrode for resistance welding during resistance welding between the overlapping wire portion 31 and the terminal projecting portion 41. The flat portion 312 extends from a site slightly closer to the X2 side than the X1-side edge is in the overlapping wire portion 31 to the X2-side edge. It is noted that the flat portion is not illustrated in FIG. 1.

As illustrated in FIG. 4, the end portion at the Z2 side of the overlapping wire portion 31 is embedded in the terminal 4 in such a manner as to be disposed closer to the Z2 side than the pair of boundary portions 6 are. That is, the position of the Z2-side end portion of the overlapping wire portion 31 is closer to the Z2 side than the specific main surface 411 is. It is noted that although the overlapping wire portion 31 is embedded in the terminal 4 entirely in the X direction of the overlapping wire portion 31 in the present embodiment, the overlapping wire portion 31 only has to be embedded in the terminal 4 at least partly in the X direction of the overlapping wire portion 31.

As illustrated in FIG. 2 and FIG. 4, the fillet portion 5 including the pair of fillet pieces 51 is formed at both sides in the Y direction of the overlapping wire portion 31. The pair of fillet pieces 51 are formed by a later-described manufacturing method so as to be substantially equivalent to each other in shape. The fillet portion 5 contains a material (that is, SUS304) constituting the terminal 4. It is noted that in FIG. 3, the fillet portion 5 is hatched for convenience. The fillet portion 5 is formed in the entire region in the X direction where the overlapping wire portion 31 is formed.

As illustrated in FIG. 2, the surface of the fillet portion 5 bulges toward a side away from the overlapping wire portion 31 in the Y direction as approaching the center of the X direction. In addition, as illustrated in FIG. 4, the surface of each of the fillet pieces 51 is, in the specific cross section, formed in an arc shape which bulges opposite the overlapping wire portion 31 side in the Y direction. In the specific cross section, the substantial center portion in the Z direction of the surface of each of the fillet pieces 51 maximumly projects opposite the overlapping wire portion 31 side in the Y direction, and the Z2-side end portion constricts toward the overlapping wire portion 31 side in the Y direction.

In the above-described manner, the temperature sensor 1 has, at least partly in the X direction, the specific cross section in which the fillet maximum width A and the boundary width B satisfy B≤A as illustrated in FIG. 4, as a cross section of the temperature sensor 1 orthogonal to the X direction and passing through the fillet portion 5. A cross section of the temperature sensor 1 orthogonal to the X direction and passing through the fillet portion 5 exists at countless points in the X direction, and at least one of the cross sections at countless points is the specific cross section.

In the specific cross section located at least partly in the X direction, the boundary width B is smaller than the fillet maximum width A. That is, in the specific cross section located at least partly in the X direction, the boundary width B and the fillet maximum width A satisfy a relationship of A>B. Furthermore, in the specific cross section located in the center of the fillet portion 5 in the X direction, the fillet maximum width A and the boundary width B satisfy a ratio A/B≥1.05.

It is noted that as illustrated in FIG. 4, the fillet portion 5 includes the pair of fillet pieces 51, and the fillet maximum width A means a length in the Y direction from one end portion in the Y direction of the fillet piece 51 disposed at one side in the Y direction of the fillet portion 5 to the other end portion in the Y direction of the fillet piece 51 disposed at the other side in the Y direction.

Figure 5:
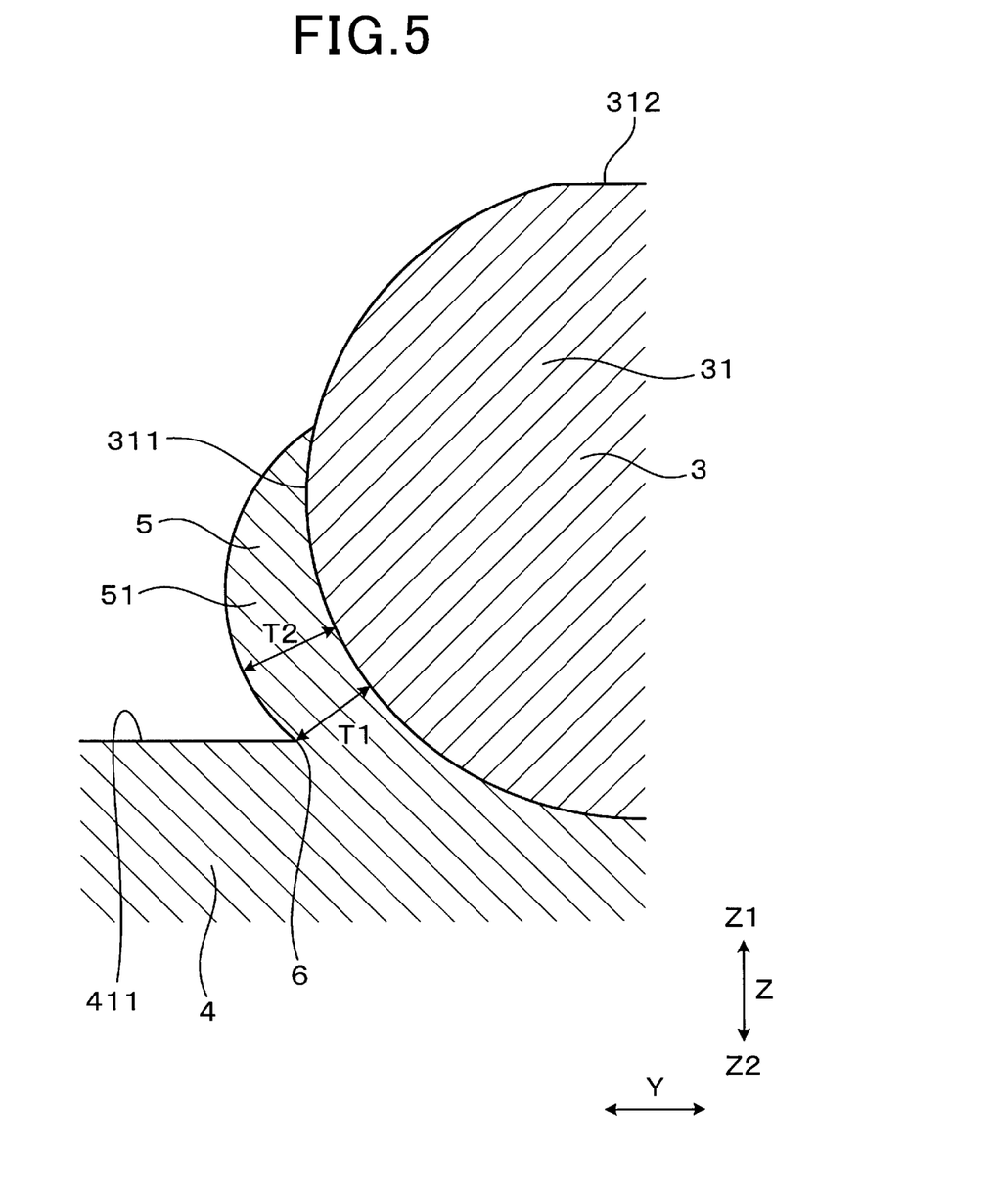
FIG. 5 is an enlarged cross-sectional view around a fillet piece of a temperature sensor, for explaining a thickness of a fillet piece in the first embodiment.

As illustrated in FIG. 5, in the specific cross section located at least partly in the X direction, at least one fillet piece 51 of the pair of fillet pieces 51 has a site with a thickness larger than a thickness T1 of the end portion at the specific main surface 411 side (that is, the Z2 side).

Here, the thickness of the fillet piece 51 in the specific cross section is a length of the fillet piece 51 in the normal line direction of the side surface 311 of the overlapping wire portion 31. In FIG. 5, the thickness of the end portion at the Z2 side of the fillet piece 51 in the specific cross section is indicated by double arrow T1, and the maximum thickness of the fillet piece 51 is indicated by double arrow T2. Arrow T1 is formed in the normal line direction of the side surface 311 of the overlapping wire portion 31 in such a manner as to pass through the boundary portion 6. In the present embodiment, the pair of fillet pieces 51 each have a site with a thickness larger than the thickness of the end portion at the specific main surface 411 side in the specific cross section located at least partly in the X direction.

As illustrated in FIG. 4, in a cross section of the temperature sensor 1 orthogonal to the X direction and passing through the fillet portion 5, the diameter of the overlapping wire portion 31 is defined as an electrode wire diameter C. Then, in the specific cross section located in the center of the fillet portion 5 in the X direction, the boundary width B and the electrode wire diameter C satisfy a ratio B/C≤6.

Here, since the overlapping wire portion 31 has the flat portion 312 in the present embodiment, the diameter of the overlapping wire portion 31 in the specific cross section is not a perfect circle. In such a case, the diameter of the overlapping wire portion 31 in the specific cross section means the diameter of the overlapping wire portion 31 in the Y direction.

As illustrated in FIG. 4, in the specific cross section located at least partly in the X direction, at least one fillet portion 5 of the pair of fillet pieces 51 extends closer to the Z1 side than a center 31c is in the Z direction of the overlapping wire portion 31. In the present embodiment, the pair of fillet pieces 51 each extend closer to the Z1 side than the center 31c is in the Z direction of the overlapping wire portion 31.

As illustrated in FIG. 4, in a cross section of the temperature sensor 1 orthogonal to the X direction and passing through the fillet portion 5, a length in the Z direction of the fillet portion 5 is defined as a fillet height D. In addition, in a cross section of the temperature sensor 1 orthogonal to the X direction and passing through the fillet portion 5, the shortest length in the Z direction between the position of the end portion at the Z2 side of the overlapping wire portion 31 in the Z direction and the pair of boundary portions 6 is defined as an embedded depth E. Then, in the specific cross section located in the center of the fillet portion 5 in the X direction, the fillet height D of at least one fillet piece 51 of the pair of fillet pieces 51 and the embedded depth E satisfy a ratio D/E≥2.

It is noted that when the lengths in the Z direction of the pair of fillet pieces 51 constituting the fillet portion 5 are different from each other in a cross section of the temperature sensor 1 orthogonal to the X direction and passing through the fillet portion 5, a pair of fillet heights D mean a length in the Z direction of the fillet piece 51 at a side having a longer length in the Z direction.

As illustrated in FIG. 1, the X1-side end portions of the pair of element electrode wires 3 are each connected to the temperature sensing element 2. The temperature sensing element 2 is fixed in a state of being sandwiched from both sides in the Y direction by the pair of element electrode wires 3. The temperature sensing element 2 and each of the pair of element electrode wires 3 are connected. The temperature sensing element 2 is constituted by, for example, a thermistor. It is noted that the temperature sensing element 2 is not limited thereto and can also be constituted by a thermocouple or a resistance bulb made of platinum or the like.

As illustrated in FIG. 1, the pair of element electrode wires 3 penetrate a tablet 11. The tablet 11 is formed in a cylindrical shape with a ceramic material including forsterite as a base material. Although not illustrated, the tablet 11 includes a pair of insertion holes formed in such a manner to penetrate in the X direction. Into the pair of insertion holes, the pair of element electrode wires 3 are inserted.

As illustrated in FIG. 1, a glass sealing body 12 is formed from the tablet 11 toward the X1 side. The glass sealing body 12 has a substantially hemispherical shape which bulges from the X1-side end portion of the tablet 11 toward the X1 side. The temperature sensing element 2 is buried inside the glass sealing body 12. The glass sealing body 12 is made of an insulating glass material. The glass sealing body 12 can be constituted by, for example, boron oxide-added borosilicate glass.

As illustrated in FIG. 1, the housing 7 is attached with a cover 13 to cover the temperature sensing element 2. The entire circumference of the X2-side end portion of the cover 13 is connected to the housing 7. The cover 13 can be made of resin. For example, similarly to the housing 7, the cover 13 can be constituted by a resin containing 33 wt % of glass fiber in polyamide resin (PA66 resin). A plurality of penetration holes 131 are formed to the wall portion of the cover 13. When the temperature sensor 1 is used, temperature measurement target gas (hydrogen in the present embodiment) of the temperature sensor 1 is introduced to the surroundings of the temperature sensing element 2 in the cover 13 via the penetration holes 131.

Next, an example of a method of resistance-welding the overlapping wire portion 31 and the terminal projecting portion 41 will be described.

First, the overlapping wire portion 31 of the element electrode wire 3 is placed on a surface at the Z1 side of the terminal projecting portion 41. In this state, the fillet portion 5 is not formed on the Z1-side surface of the terminal projecting portion 41, and the Z1-side surface of the terminal projecting portion 41 is formed in a planar shape orthogonal to the Z direction.

Subsequently, a pair of electrodes for resistance welding are placed at both sides in the Z direction of the overlapping wire portion 31 and the terminal projecting portion 41. Thereafter, the overlapping wire portion 31 and the terminal projecting portion 41 are sandwiched by the pair of electrodes to be applied with pressure, and an electric current is caused to flow between the pair of electrodes, in order to perform a welding process of welding the periphery of a contact portion with the overlapping wire portion 31 in the terminal projecting portion 41.

In the welding process, the contact portion with the overlapping wire portion 31 in the terminal projecting portion 41 is welded, and pressure applied by the pair of electrodes causes the overlapping wire portion 31 to be somewhat embedded into the terminal projecting portion 41. In addition, at the same time, the welded portion of the terminal projecting portion 41 crawls up toward the Z1 side along the side surface 311 of the overlapping wire portion 31 to achieve the shape of the fillet portion 5. Subsequently, electricity flowing between the pair of electrodes is terminated, and the welded portion of the terminal projecting portion 41 is solidified thereby to form the fillet portion 5.

Here, when the temperature of the welded portion of the terminal projecting portion 41 becomes excessively high in the welding process, fluidity (wettability) of the welded portion becomes high. Therefore, the welded portion is unlikely to crawl up along the side surface 311 of the overlapping wire portion 31. Accordingly, the welded portion does not achieve the shape of the fillet portion 5 according to the present embodiment and becomes a fillet portion 9 having a widening shape in which the width in the Y direction increases toward the Z2 side as illustrated in FIG. 6.

Therefore, in the welding process, an electric current caused to flow between the pair of electrodes is set lower in order to prevent the temperature of the welded portion of the terminal projecting portion 41 from becoming excessively high to increase fluidity (wettability) of the welded portion. Accordingly, the welded portion becomes likely to crawl up along the side surface 311 of the overlapping wire portion 31, and the shape of the fillet portion 5 according to the present embodiment can be formed.

Figure 6:
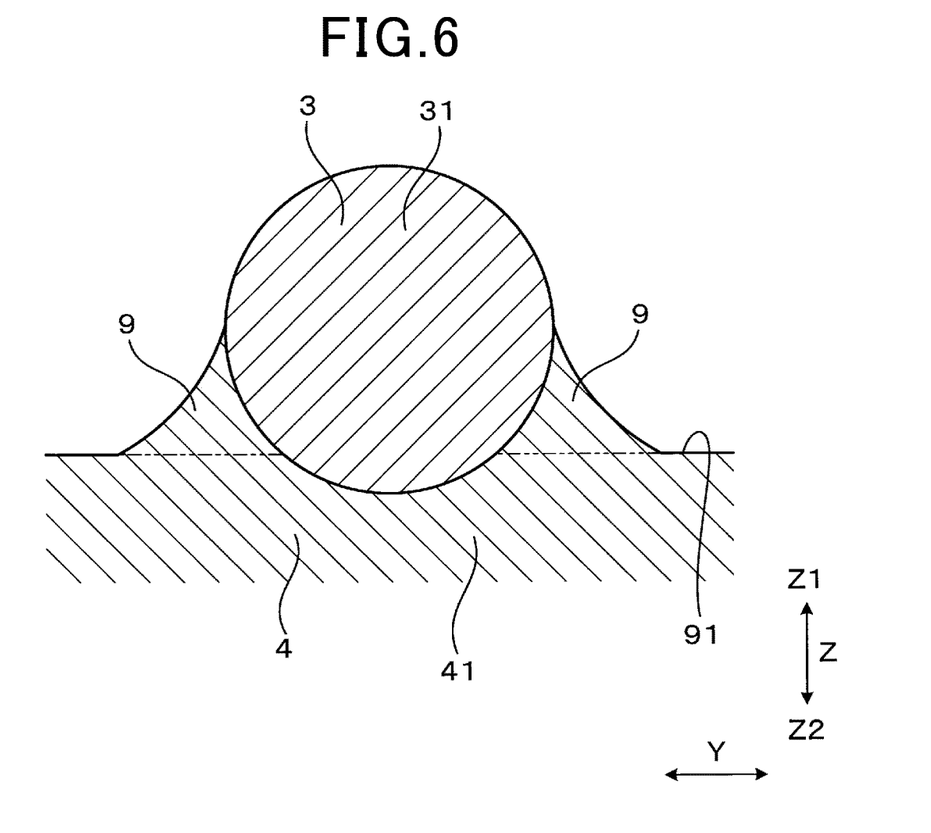
FIG. 6 is a view for illustrating a comparative embodiment and a cross-sectional view corresponding to the cross section of FIG. 4.

Furthermore, it is also conceivable that even if the welded portion has been formed into the shape of the fillet portion 5 according to the present embodiment, the shape of the welded portion is broken from the shape of the fillet portion 5 according to the present embodiment to become the above-described fillet portion 9 having a widening shape as illustrated in FIG. 6, when the duration of the welding process (that is, the duration during which an electric current is caused to flow between the pair of electrodes) is excessively long. Therefore, the duration of the welding process is set to a short time to a degree that the shape of the welded portion formed in the shape of the fillet portion 5 according to the present embodiment is not broken. In this manner, the overlapping wire portion 31 and the terminal projecting portion 41 are resistance-welded.

Next, the operations and effects of the present embodiment will be described.

The temperature sensor 1 according to the present embodiment has, at least partly in the X direction, the specific cross section satisfying B≤A, as a cross section orthogonal to the X direction and passing through the fillet portion 5. Therefore, an area orthogonal to the Z direction of the root portion of the fillet portion 5 can be reduced. Accordingly, heat dissipation from the element electrode wire 3 to the terminal 4 via the fillet portion 5 can be suppressed. As a result, responsivity of temperature measurement in the temperature sensor 1 and accuracy of temperature measurement can be improved.

In addition, in the specific cross section located in the center of the fillet portion 5 in the X direction, the fillet maximum width A and the boundary width B satisfy the ratio A/B≥1.05. Accordingly, the overlapping wire portion 31 is unlikely to suffer damage and detach from the fillet portion 5, and the temperature sensor 1 having high durability can be obtained. It is noted that the above-described numerical values will be supported by experimental examples described later.

Further, in the specific cross section located in the center of the fillet portion 5 in the X direction, the boundary width B and the electrode wire diameter C satisfy the ratio B/C≤6. Therefore, heat dissipation from the element electrode wire 3 to the terminal 4 via the fillet portion 5 can be suppressed, and responsivity of temperature measurement in the temperature sensor 1 and accuracy of temperature measurement can be improved. It is noted that the above-described numerical values will be supported by experimental examples described later.

Furthermore, in the specific cross section located at least partly in the X direction, at least one fillet piece 51 of the pair of fillet pieces 51 extends closer to the Z1 side than the center 31c is in the Z direction of the overlapping wire portion 31 of the element electrode wire 3. That is, a wide range of the side surface 311 of the overlapping wire portion 31 is covered by the fillet portion 5. Therefore, the overlapping wire portion 31 is unlikely to suffer damage and detach from the fillet portion 5.

Moreover, the end portion at the Z2 side of the overlapping wire portion 31 is embedded in the terminal 4 in such a manner as to be disposed closer to the Z2 side than the boundary portions 6 are. In the specific cross section located in the center of the fillet portion 5 in the X direction, the fillet height D of at least one fillet piece 51 of the pair of fillet pieces 51 and the embedded depth E satisfy the ratio D/E≥2. Accordingly, the overlapping wire portion 31 is unlikely to suffer damage and detach from the fillet portion 5, and the temperature sensor 1 having high durability can be obtained. It is noted that the above-described numerical values will be supported by experimental examples described later.

Further, in the specific cross section located at least partly in the X direction, at least one fillet piece 51 of the pair of fillet pieces 51 has a site with a thickness larger than the thickness of the end portion at the Z2 side. In other words, in the specific cross section located at least partly in the X direction, the thickness of the end portion at the Z2 side in at least one fillet piece 51 of the pair of fillet pieces 51 does not constitute the maximum thickness of the fillet piece 51. Therefore, an area orthogonal to the Z direction of the root portion of the fillet portion 5 can be further reduced. Accordingly, heat dissipation from the element electrode wire 3 to the terminal 4 via the fillet portion 5 is further likely to be suppressed. As a result, responsivity of temperature measurement in the temperature sensor 1 and accuracy of temperature measurement can be improved.

Thus, according to the present embodiment, there can be provided the temperature sensor which can suppress heat dissipation from the element electrode wire to the terminal via the fillet portion.

It is noted that below-described constituents and the like with the same reference numerals as reference numerals used in the previous embodiment denote the same constituents and the like as those in the previous embodiment, unless otherwise indicated.

Experimental Example 1

The present example is an experimental example in which connection strength between the element electrode wire 3 and the terminal 4 was evaluated for a plurality of samples with variously modified the ratio A/B that is a ratio of the fillet maximum width A to the boundary width B in a later-described center cross section. The center cross section is a cross section of the temperature sensor 1 orthogonal to the X direction and passing through the center in the X direction of the fillet portion.

In the present example, four samples 1 to 4, which have the same basic structure as the temperature sensor 1 according to the first embodiment but different ratio A/B in the center cross section, were prepared. In the center cross section, sample 1 has a ratio A/B of 0.8, sample 2 has a ratio A/B of 1.0, sample 3 has a ratio A/B of 1.05, and sample 4 has a ratio A/B of 1.2. The ratio A/B of the center cross section in each of samples 1 to 4 was adjusted by changing a pressure applied by the pair of electrodes on the overlapping wire portion 31 and the terminal projecting portion 41 and an electric current value caused to flow between the pair of electrodes, in the above-described welding process during manufacture of the temperature sensor 1.

The element electrode wire 3 of each sample was constituted by platinum alloy including Pt as a base material and containing 20 wt % of Ir, similarly to the first embodiment. The element electrode wire 3 of each sample had a diameter of 0.25 mm. In addition, the terminal 4 of each sample was constituted by SUS304, similarly to the first embodiment. The terminal 4 of each sample had a plate thickness as a size in the Z direction of 0.6 mm and a width as a size in the Y direction of 1.5 mm.

Next, test conditions of the present example will be described.

In the present example, vibration stress to act on the temperature sensor 1 caused by shock during charging of hydrogen into a hydrogen tank was simulated, and the frequency was swept at an acceleration of 20 G in a frequency band around a primary resonance frequency to vibrate each sample in the Z direction. The total number of oscillations was defined as the total number of oscillations of the temperature sensor 1 when a vehicle equipped with the temperature sensor 1 was repeatedly subjected to charging of hydrogen into a hydrogen tank for 15 years. It is noted that the primary resonance frequency is a primary resonance frequency of the temperature sensing element 2 measured by a laser doppler vibrometer.

Next, an evaluation method of the connection strength between the element electrode wire 3 and the terminal 4 will be described.

In the present example, the connection strength was evaluated as "acceptable" when a break did not occur between the element electrode wire 3 and the terminal 4 after testing, and evaluated as "unacceptable" when a break occurred between the element electrode wire 3 and the terminal 4.

The results are illustrated in Table 1.

TABLE 1

|  | A/B | Evaluation |
|---|---|---|
| Sample 1 | 0.8 | Unacceptable |
| Sample 2 | 1 | Unacceptable |
| Sample 3 | 1.05 | Acceptable |
| Sample 4 | 1.2 | Acceptable |

As understood from Table 1, samples 1 and 2, in which the ratio A/B in the center cross section is 1 or less, is evaluated as unacceptable. That is, it was found that in samples 1 and 2 in which the ratio A/B in the center cross section is 1 or less, a break occurred between the element electrode wire 3 and the terminal 4. It was confirmed that in both of samples 1 and 2, a break occurred at a connection portion between the overlapping wire portion 31 of the element electrode wire 3 and the terminal 4 after testing.

On the other hand, it is understood that samples 3 and 4 in which the ratio A/B in the center cross section is 1.05 or more are evaluated as acceptable. That is, it is understood that when the fillet maximum width A and the boundary width B satisfy the ratio A/B≥1.05 in the specific cross section located in the center of the fillet portion 5 in the X direction, the overlapping wire portion 31 is unlikely to suffer damage and detach from the fillet portion 5, and the temperature sensor 1 having high durability can be obtained.

Experimental Example 2

The present example is an experimental example in which the connection strength between the element electrode wire 3 and the terminal 4 was evaluated for a plurality of samples with variously modified ratio D/E that is a ratio of the fillet height D to the embedded depth E in the center cross section.

In the present example, four samples 5 to 8, which have the same basic structure as the temperature sensor 1 according to the first embodiment but different ratio D/E in the center cross section, were prepared. In the center cross section, sample 5 has a ratio D/E of 1.2, sample 6 has a ratio D/E of 1.8, sample 7 has a ratio D/E of 2.0, and sample 8 has a ratio D/E of 3.0. The ratio D/E of the center cross section in each of samples 5 to 8 was adjusted by changing a pressure applied by the pair of electrodes on the overlapping wire portion 31 and the terminal projecting portion 41 and an electric current value caused to flow between the pair of electrodes, in the above-described welding process during manufacture of the temperature sensor 1.

In each sample, the ratio A/B, which is a ratio of the fillet maximum width A to the boundary width B, satisfies the ratio A/B≥1 in the center cross section. Specifically, the ratio A/B of each example in the center cross section was set to 1.2. The materials and shapes of the element electrode wire 3 and the terminal 4 of each sample were the same as those described in experimental example 1. In addition, the test conditions and the evaluation method of connection strength between the element electrode wire 3 and the terminal 4 were the same as those in experimental example 1.

The results are indicated in Table 2.

TABLE 2

|  | D/E | Evaluation |
| --- | --- | --- |
| Sample 5 | 1.2 | Unacceptable |
| Sample 6 | 1.8 | Unacceptable |
| Sample 7 | 2 | Acceptable |
| Sample 8 | 3 | Acceptable |

As understood from Table 2, samples 5 and 6 in which the ratio D/E in the center cross section is 1.8 or less are evaluated as unacceptable. That is, it was found that in samples 5 and 6 in which the ratio D/E in the center cross section is 1.8 or less, a break occurred between the element electrode wire 3 and the terminal 4. It was confirmed that in both of samples 5 and 6, a break occurred at a connection portion between the overlapping wire portion 31 of the element electrode wire 3 and the terminal 4 after testing.

On the other hand, it is understood that samples 7 and 8 in which the ratio D/E in the center cross section is 2.0 or more are evaluated as acceptable. Therefore, it is understood that when the fillet height D and the embedded depth E satisfy the ratio D/E≥2 in the specific cross section located in the center of the fillet portion 5 in the X direction, the overlapping wire portion 31 is unlikely to suffer damage and detach from the fillet portion 5, and the temperature sensor 1 having high durability can be obtained. It is considered that this is because as the ratio D/E increases in a cross section of the temperature sensor 1 orthogonal to the X direction and passing through the fillet portion 5, the fillet portion 5 further surrounds the overlapping wire portion 31 of the element electrode wire 3 to improve durability to vibrations in the Z direction.

Third Experimental Example

The present example is an experimental example in which responsivity of temperature measurement in the temperature sensor 1 was evaluated for a plurality of samples with variously modified ratios B/C that is a ratio of the boundary width B to the electrode wire diameter C in the center cross section.

In the present example, seven samples, which have the same basic structure as the temperature sensor 1 according to the first embodiment but different the ratio B/C in the center cross section, were prepared. The ratio B/C of each sample in the center cross section is illustrated by the horizontal axis of FIG. 7. The ratio B/C of the center cross section in each of these seven samples was adjusted by changing a pressure applied by the pair of electrodes on the overlapping wire portion 31 and the terminal projecting portion 41 and an electric current value caused to flow between the pair of electrodes, in the above-described welding process during manufacture of the temperature sensor 1.

In each sample, the ratio A/B, which is a ratio of the fillet maximum width A to the boundary width B, satisfies the ratio A/B≥1.05 in the center cross section. Specifically, the ratio A/B of each example in the center cross section was set to 1.2. The materials and shapes of the element electrode wire 3 and the terminal 4 of each sample were the same as those described in experimental example 1.

Next, test conditions of the present example will be described.

In the present example, responsivity of temperature measurement of the temperature sensor 1 was evaluated for each sample, by measuring a 63% response time. Specifically, the temperature around the temperature sensing element 2 of each sample is firstly brought to a state at 25° C. Then, the periphery of the temperature sensing element 2 of each sample was placed from this state into a gas channel at a gas temperature of 100° and a flow rate of 10 msec to measure a 63% response time of each sample. In the present example, the change amount of 63% when the temperature change amount from 25° C. to 100° C. is defined as 100% is (100° C.−25° C.)×0.63=47.25° C. Therefore, a 63% response time means a time which has been taken until each sample produces a reading of 72.25° C. which is obtained by adding 47.25° C. to 25° C. that is a temperature when a test started. It can be said that a sample having a shorter 63% response time has higher responsivity of temperature measurement in the temperature sensor 1. The 63% response time is illustrated by the vertical axis of FIG. 7.

The results are illustrated in Table 7.

Figure 7:
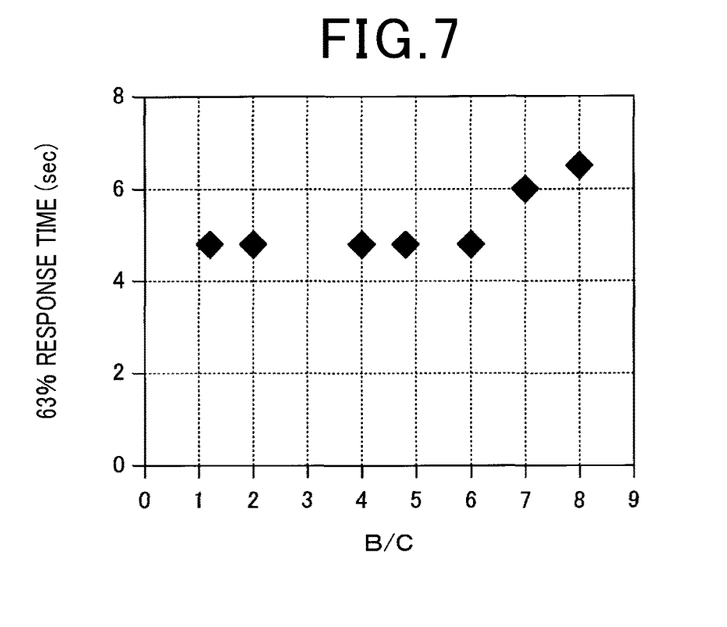
FIG. 7 is a chart illustrating a relationship between ratio B/C and 63% response time in a third experimental example.

As understood from FIG. 7, samples satisfying ratio the B/C≤6 in the center cross section have a shorter 63% response time than samples satisfying ratio the B/C>6 have in the center cross section. Therefore, it is understood that when the boundary width B and the electrode wire diameter C satisfy the ratio B/C≤6 in the specific cross section located in the center of the fillet portion 5 in the X direction, responsivity of temperature measurement in the temperature sensor 1 is high. It is considered that this is because as the boundary width B decreases relative to the electrode wire diameter C in a cross section of the temperature sensor 1 orthogonal to the X direction and passing through the fillet portion 5, an area orthogonal to the Z direction of the root portion of the fillet portion 5 is likely to decrease, and heat dissipation from the element electrode wire 3 to the terminal 4 via the fillet portion 5 can be suppressed.

It is noted that although the present disclosure has been described in accordance with examples, it is understood that the present disclosure is not limited to the examples and structures. The present disclosure encompasses various variation examples or variations within the equivalent scope. In addition, various combinations and embodiments, and furthermore, other combinations and embodiments which include only one element, more than that, or less than that, to the various combinations or embodiments also fall within the category or conceptual scope of the present disclosure.

For example, the surface of the terminal may be subjected to plating. In this case, the expression terminal also includes the plating on the terminal. As plating, nickel plating or the like can be adopted. In this case, the fillet portion is mainly formed by melting plating and contains metal which constitutes plating. In addition, the fillet portion can also be strengthened by solid solution hardening between the material of the non-plated part of the terminal and the material of the plating.

What is claimed is:

1. A temperature sensor comprising:
    a temperature sensing element for detecting a temperature;
    a pair of element electrode wires connected to the temperature sensing element, and
    a pair of terminals connected to respective ones of a pair of the element electrode wires, wherein
    the element electrode wires each have an overlapping wire portion connected to the terminal in such a manner as to overlap the terminal in an overlapping direction orthogonal to a sensor axis direction,
    a fillet portion is disposed on a side surface of the overlapping wire portion, the fillet portion having a pair of fillet pieces formed in such a manner as to crawl up from a specific main surface that is a main surface at the overlapping wire portion side in the terminal, and
    when a direction orthogonal to both the sensor axis direction and the overlapping direction is defined as a width direction, and in a cross section orthogonal to the sensor axis direction and passing through the fillet portion, a maximum length in the width direction of the fillet portion is defined as a fillet maximum width A, and a length in the width direction between a pair of boundary portions between a pair of the fillet pieces and the specific main surface is defined as a boundary width B,
    the temperature sensor has, at least partly in the sensor axis direction, a specific cross section satisfying B≤A, as a cross section orthogonal to the sensor axis direction and passing through the fillet portion.

2. The temperature sensor according to claim 1, wherein a cross section orthogonal to the sensor axis direction and passing through the center of the fillet portion in the sensor axis direction is the specific cross section, and in the specific cross section located in the center of the fillet portion in the sensor axis direction, the fillet maximum width A and the boundary width B satisfy a ratio A/B≥1.05.

3. The temperature sensor according to claim 2, wherein when a cross section orthogonal to the sensor axis direction and passing through the center of the fillet portion in the sensor axis direction is the specific cross section, and a diameter of the overlapping wire portion in a cross section orthogonal to the sensor axis direction and passing through the fillet portion is defined as an electrode wire diameter C, the boundary width B and the electrode wire diameter C satisfy a ratio B/C≤6 in the specific cross section located in the center of the fillet portion in the sensor axis direction.

4. The temperature sensor according to claim 1, wherein in the specific cross section located at least partly in the sensor axis direction, at least one fillet piece of a pair of the fillet pieces extends to a side further from the terminal in the overlapping direction than a center is in the overlapping direction in the overlapping wire portion of the element electrode wire.

5. The temperature sensor according to claim 1, wherein when a cross section orthogonal to the sensor axis direction and passing through the center of the fillet portion in the sensor axis direction is the specific cross section, and the terminal side opposite the overlapping wire portion in the overlapping direction is defined as an embedded side, an end portion at the embedded side of the overlapping wire portion is embedded in the terminal in such a manner as to be disposed closer to the embedded side than a pair of the boundary portions are, and when in a cross section orthogonal to the sensor axis direction and passing through the fillet portion, a length in the overlapping direction of the fillet portion is defined as a fillet height D, and a shortest length in the overlapping direction between a position of an end portion at the embedded side of the overlapping wire portion and a pair of the boundary portions is defined as an embedded depth E, the fillet height D of at least one fillet piece of a pair of the fillet pieces and the embedded depth E satisfy a ratio D/E≥2 in the specific cross section located in the center of the fillet portion in the sensor axis direction.

6. The temperature sensor according to claim 1, wherein in the specific cross section located at least partly in the sensor axis direction, at least one fillet piece of a pair of the fillet pieces has a site with a thickness larger than a thickness of an end portion at the specific main surface side.

7. The temperature sensor according to claim 1, wherein each of the pair of fillet pieces directly contacts the overlapping wire portion; and
the fillet pieces are positioned on opposing sides of the overlapping wire portion in the width direction.

8. The temperature sensor according to claim 1, wherein the pair of fillet pieces are substantially equivalent to each other in shape.

9. The temperature sensor according to claim 1, wherein a surface of each of the pair of fillet pieces bulges toward a side away from the overlapping wire portion in the width direction and bulges in an opposite direction from the surface of the other fillet piece of the pair of fillet pieces in the width direction.

10. The temperature sensor according to claim 1, wherein each of the pair of fillet pieces directly contacts the overlapping wire portion; and
the fillet pieces are positioned on opposing sides of the overlapping wire portion in the width direction; and the fillet maximum width extends between a first outermost boundary of one of the pair of fillet pieces in the width direction and a second outermost boundary of another of the pair of fillet pieces in the width direction.

\* \* \* \* \*